Patented July 10, 1951

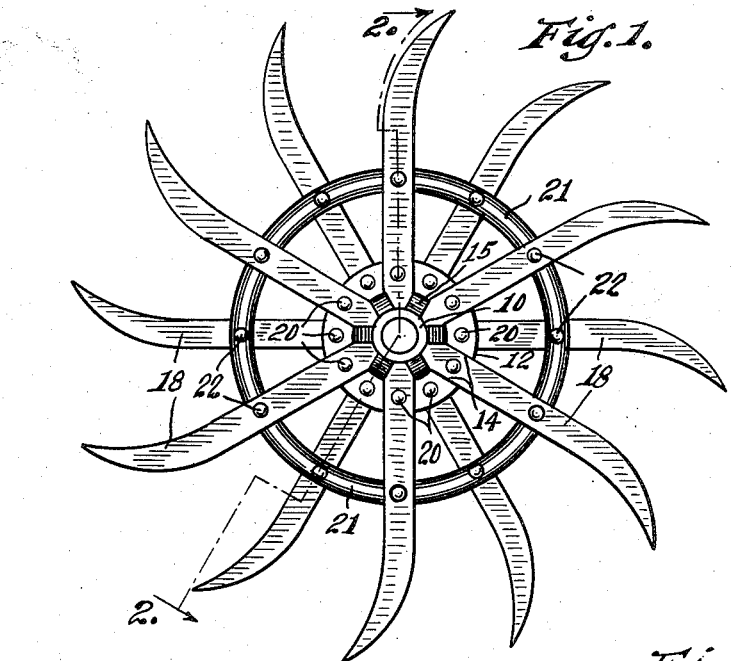
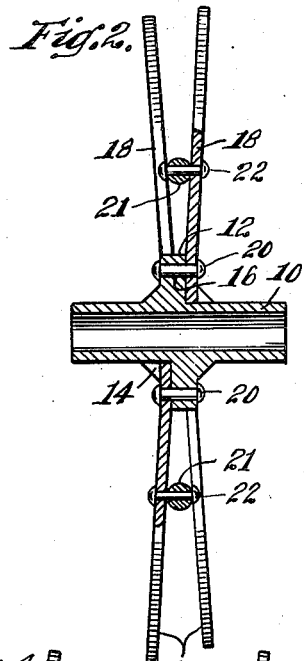
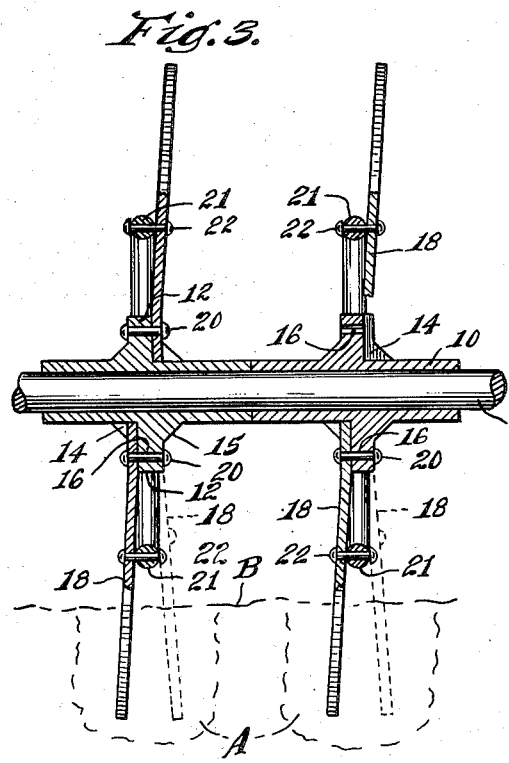
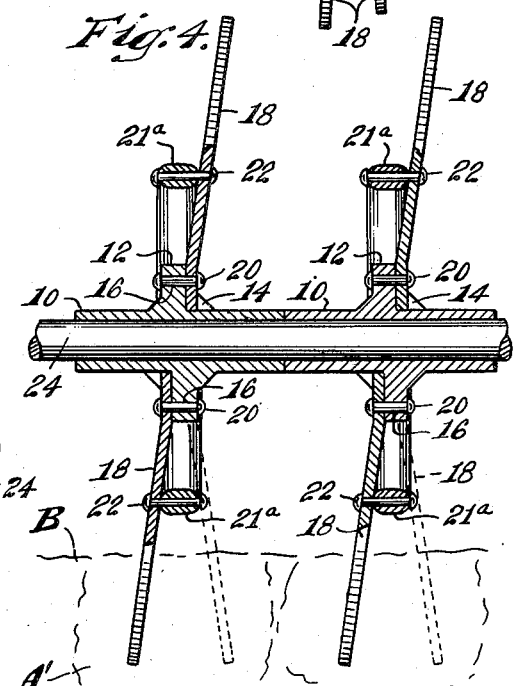

2,560,359

UNITED STATES PATENT OFFICE 2,560,359

ROTARY HOE WHEEL

Edmund A. McCardell, Newton, Iowa, assignor to Winpower Mfg. Company, Newton, Iowa, a corporation of Iowa Application January 22, 1949, Serial No. 72,209

2 Claims. (Cl. 97—212)

This invention relates to a hoe wheel of the rotary type used in those farm machines commonly known as "pulverizers."

One object of the invention is to provide a hoe wheel construction which is relatively simple and inexpensive, the parts thereof being assembled together with a minimum of labor.

Another object of the invention is to provide a hoe wheel of substantially open construction wherein the teeth of the wheel are anchored at their inner ends to a hub plate and reinforced against angular movement in relation to the hub plate by an outer spacer ring, the ring surrounding the hub and being secured to the teeth of the wheel and thereby causing the teeth to mutually reinforce each other due to such connection, the spacer ring also serving to space alternate teeth apart with relation to a plane at right angles to the axis of rotation whereby the hoe wheel thereby covers a greater area of ground surface than those types of hoes wherein the teeth rotate in the same plane, thus making for greater pulverization of the soil.

A further object is to provide a hoe wheel provided with teeth and a spacer ring between them whereby the ring can be of thicker material if it is desirable to spread the teeth to a greater extent.

With these and other objects in view, my invention consists in the construction, arrangement and combination of the various parts of my hoe wheel whereby the objects contemplated are attained, as hereinafter more fully set forth, pointed out in my claims and illustrated in the accompanying drawings, wherein:

Figure 1 is a side elevation of a rotary hoe wheel embodying my present invention.

Figure 2 is a sectional view on the line 2—2 of Figure 1.

Figure 3 is a similar sectional view showing two of the hoe wheels mounted on a shaft, and Figure 4 is a similar sectional view showing a thicker spacer ring for spreading the teeth to a greater extent.

On the accompanying drawings I have used the reference numeral 10 to indicate a hub which may be of cast or malleable iron, or formed of cast steel or the like. The hub 10 has a flange 12 extending therearound and reinforced by circumferentially spaced buttresses 15.

Between the buttresses, notches 14 are provided in which the inner ends of hoe teeth 18 are positioned. These inner ends of the teeth are secured to the flange 12 by rivets 20 through openings 16 of the flange 12. The teeth 18 are curved on their outer ends in the usual manner and formed on their inner ends to fit into the sockets 14 as shown in Figure 1.

The teeth 18 are arranged alternately on opposite sides of the flange 12 and a spacer ring 21 is provided surrounding the flange and positioned between the alternate teeth. The spacer ring is secured in position by rivets 12.

As shown by solid and dotted lines at the bottom of Figure 3 the alternate teeth 18 assume different paths of travel which disturb the ground substantially as indicated by the area A in Figure 3, the ground level being indicated at B.

If it is desirable to disturb a greater area such as A' in Figure 4, this may be accomplished by using a thicker spacer ring 21a when manufacturing the hoe wheel. The resulting structure in each instance provides a relatively open type of hoe wheel with the teeth 18 securely anchored at their inner ends to the hub plate 12 and mutually reinforced intermediate their ends by the spacer rings 21 or 21a.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a rotary hoe wheel of the character disclosed, a relatively small-diameter hub plate, a plurality of radial teeth having their inner ends secured to said hub plate, and a ring-like spacer surrounding said hub plate, said teeth being disposed alternately on opposite sides of said spacer and secured to the spacer, said spacer being disposed intermediate the ends of said teeth, said ring being of greater thickness axially than said hub plate, whereby the teeth diverge radially outwardly on opposite sides of a plane in which the secured inner ends of said radial teeth lie.

2. In a rotary hoe wheel of the character disclosed, a relatively small-diameter hub plate, said hub plate having radial sockets on opposite sides thereof and alternating circumferentially of the hub plate, buttresses between circumferentially adjacent sockets on each side of the hub plate, said buttresses being disposed adjacent the axis of the hub plate, a plurality of radial teeth having their inner ends in said sockets and between adjacent buttresses, and a ring-like spacer surrounding said hub plate, said teeth being disposed alternately on opposite sides of said spacer and secured to the spacer, said spacer being disposed intermediate the ends of said teeth, said ring being of greater thickness axially than the distance between the inner ends of the teeth on opposite sides of the hub plate, whereby the teeth diverge radially outwardly on opposite sides of a plane in which the inner ends of said teeth are located.

EDMUND A. McCARDELL.

REFERENCES CITED

The following references are of record in the file of this patent:

UNITED STATES PATENTS

| Number | Name | Date |
|---|---|---|
| 1,217,326 | Meinecke | Feb. 27, 1917 |
| 1,845,936 | Rude | Feb. 16, 1932 |